United States Patent
Mansour et al.

(10) Patent No.: US 7,978,724 B1
(45) Date of Patent: Jul. 12, 2011

(54) SYSTEMS AND METHODS OF ALLOCATING RADIO RESOURCES

(75) Inventors: Nagi A. Mansour, Arlington, VA (US); Habib Riazi, Stafford, VA (US); Mathew Starzec, Fairfax, VA (US); Petronilo Cailipan, Briston, VA (US)

(73) Assignee: Clear Wireless LLC, Kirkland, WA (US)

( * ) Notice: Subject to any disclaimer, the term of this patent is extended or adjusted under 35 U.S.C. 154(b) by 768 days.

(21) Appl. No.: 12/021,665

(22) Filed: Jan. 29, 2008

(51) Int. Cl.
*H04J 4/00* (2006.01)

(52) U.S. Cl. .......................................... 370/436

(58) Field of Classification Search .................. None
See application file for complete search history.

(56) References Cited

U.S. PATENT DOCUMENTS

| 6,865,393 | B1 | 3/2005 | Baum et al. |
| 7,280,804 | B2 | 10/2007 | Jacobsen et al. |
| 2005/0068884 | A1 * | 3/2005 | Yoon et al. .................... 370/203 |
| 2007/0060145 | A1 | 3/2007 | Song et al. |
| 2007/0248048 | A1 * | 10/2007 | Zhu et al. ...................... 370/329 |

* cited by examiner

*Primary Examiner* — Anh-Vu Ly
(74) *Attorney, Agent, or Firm* — Crowell & Moring LLP

(57) ABSTRACT

Systems and methods of allocating radio resources are provided. It is determined whether a bandwidth assigned to a communication station can be satisfied using available subchannels and a modulation and coding scheme (MCS). When the bandwidth cannot be satisfied using available subchannels and MCS, a number of the available subchannels and an MCS are selected. A power level for communications transmitted to the communication station is adjusted relative to a power level determined based a signal quality measurement. Information is transmitted to the communication station using the selected number of subchannels, MCS and adjusted power level.

12 Claims, 4 Drawing Sheets

SYSTEMS AND METHODS OF ALLOCATING RADIO RESOURCES

BACKGROUND OF THE INVENTION

Wireless communication networks typically include a number of base stations, each of which supports one or more communication stations within a particular geographic area. Communications transmitted from a communication station to a base station are carried on the uplink communication link, and communications transmitted from a base station to a communication station are carried on the downlink communication link. Because wireless communication networks include a number of base stations and communication stations that share the wireless air interface, the various transmission can cause interference to each other. Various techniques are employed to minimize this interference, including transmitting on different frequency bands (frequency division multiple access (FDMA)), transmitting in different time slots (time division multiple access (TDMA)), transmitting using different spreading codes ((code division multiple access (CDMA)), transmitting using selected frequencies within a particular frequency band (orthogonal frequency division multiple access (OFDMA)) or a combination of one or more of these techniques.

SUMMARY OF THE INVENTION

Systems and method of allocating radio resources are provided. An exemplary method includes a determination of whether a bandwidth assigned to a communication station can be satisfied using available subchannels and a modulation and coding scheme (MCS). When the bandwidth cannot be satisfied using available subchannels and MCS, a number of the available subchannels are selected, an MCS is selected, and a power level for communications transmitted to the communication station is adjusted relative to a power level determined based a signal quality measurement. Information is transmitted to the communication station using the selected number of subchannels, MCS and adjusted power level.

An exemplary system includes a base station, which includes a transceiver coupled to an antenna and a processor. The processor includes bandwidth satisfaction logic that determines whether a bandwidth assigned to a communication station can be satisfied using available subchannels and a modulation and coding scheme (MCS). When the bandwidth cannot be satisfied using available subchannels and MCS, subchannel selection logic selects a number of the available subchannels, MCS selection logic selects an MCS, and power level selection logic adjusts a power level for communications transmitted to the communication station relative to a power level determined based a signal quality measurement. The base station transmits information to the communication station using the selected number of subchannels, MCS and adjusted power level.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
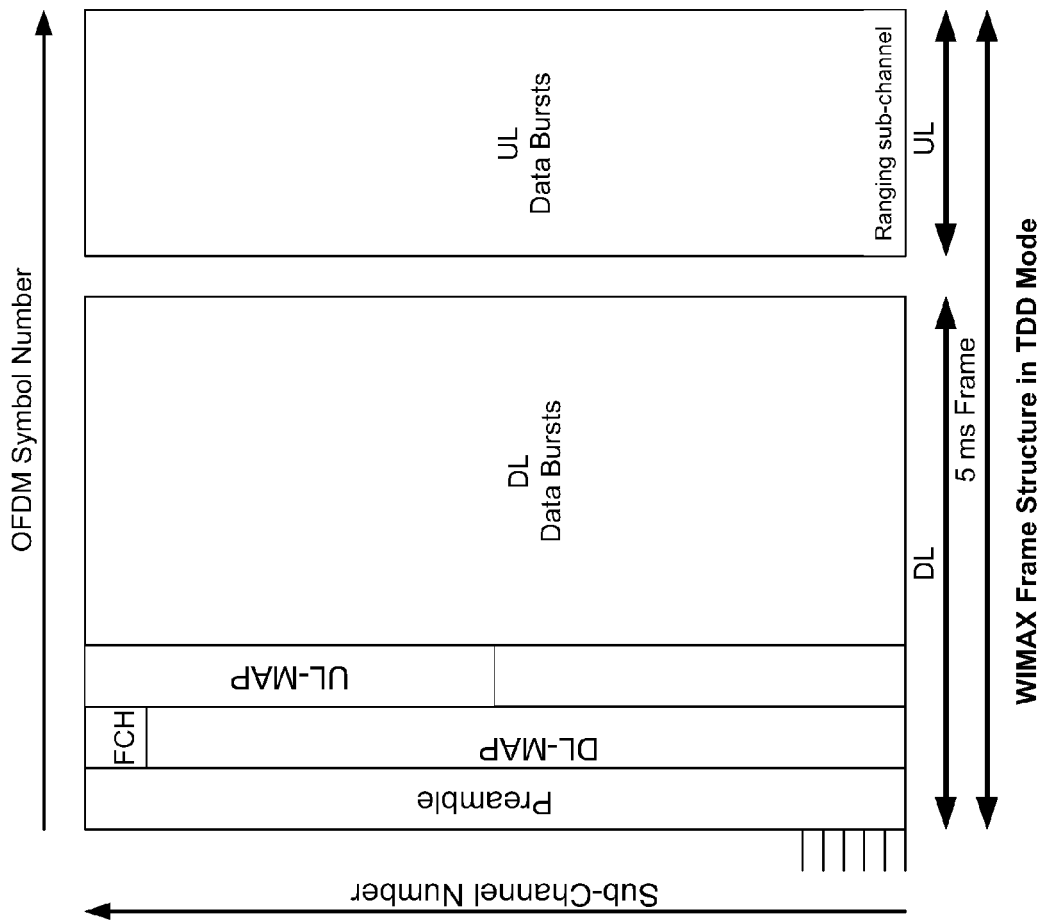
FIG. 1 is a block diagram of an exemplary WiMAX time division duplex (TDD) frame.

Exemplary embodiments of the present invention involve testing wireless networks that employ orthogonal frequency division multiplexing (OFDM), such as a WiMAX network. FIG. 1 is a block diagram of an exemplary WiMAX time division duplex (TDD) frame. The frame structure begins with a preamble that is used for physical layer procedures, such as time and frequency synchronization and initial channel estimation. The downlink (DL) preamble is followed by a frame control header (FCH) that provides frame configuration information, such as MAP message length and the usable sub-carriers. Multiple users are allocated data regions within the frame, and these allocations are specified in the uplink and downlink messages (DL-MAP and UL-MAP). In the TDD operation using a 10 MHz channel, the frame has an allocation in time of 48 symbols and an allocation in frequency using 1024 sub-carriers. For the downlink/uplink ratio of 3:2 there will be 22:15 data symbols with the rest of the frame used for preamble and control channels. Symbols and sub-carriers are resources that can be assigned to users.

For example, in a WiMAX system that use a 10 MHz channel 840 sub-carriers are used to carry user data and pilots in the uplink. The 840 sub-carriers constitute 35 sub-channels, and each sub-channel has 16 user data sub-carriers and 8 pilot sub-carriers.

Figure 2:
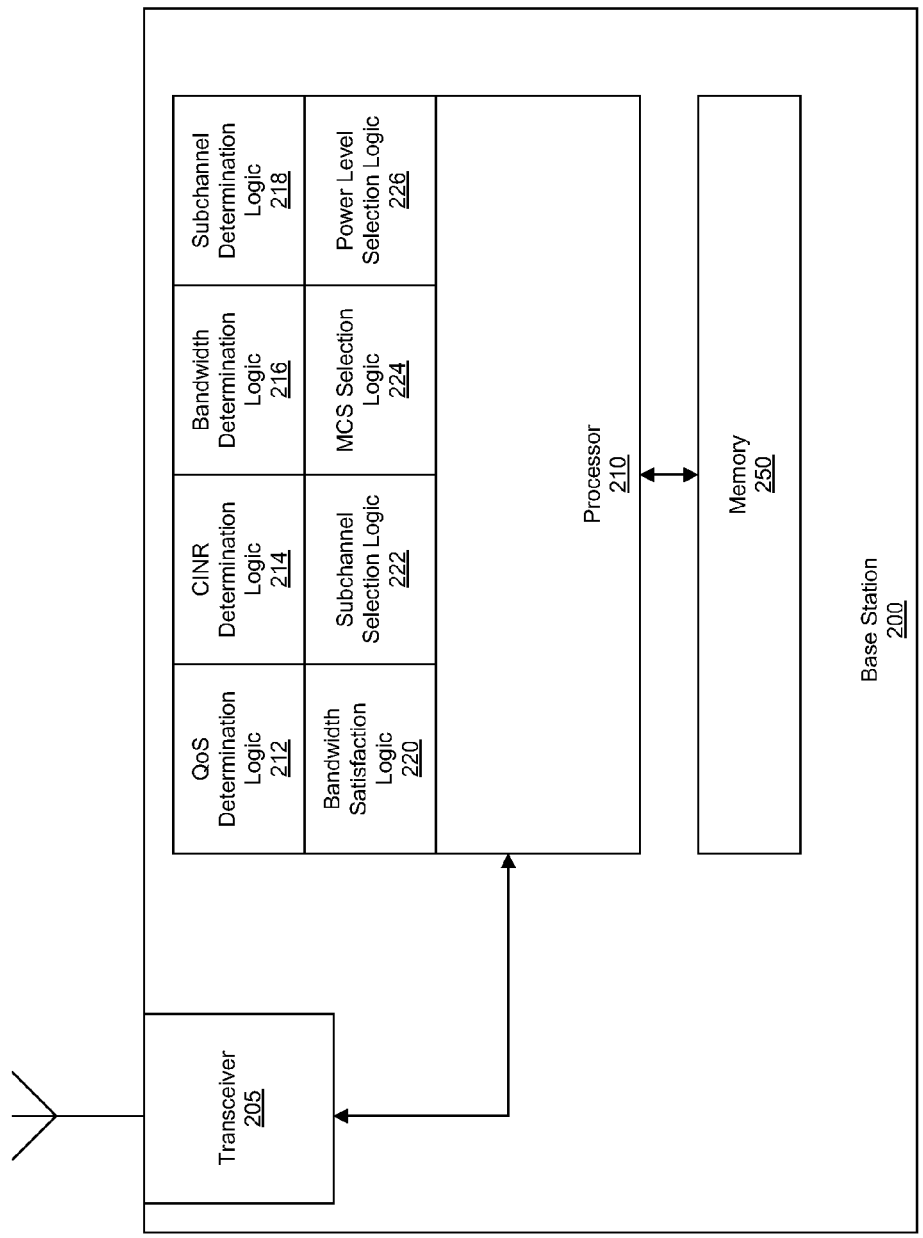
FIG. 2 is a block diagram of an exemplary base station in accordance with the present invention.

FIG. 2 is a block diagram of an exemplary base station in accordance with the present invention. Base station 200 includes transceiver 205 coupled to an antenna for transmitting and receiving communications with communication stations. Transceiver 205 is also coupled to processor 210, which is in turn coupled to memory 250. Processor 210 includes logic 212-226, which will be described in more detail below in connection with FIGS. 3 and 4. Processor 205 can be any type of processor, such as a microprocessor, field programmable gate array (FPGA) and/or an application specific integrated circuit (ASIC). When processor 210 is a microprocessor then logic 212-226 can be processor-executable code loaded from memory 250. It will be recognized that FIG. 2 is a simplified diagram of the base station, and the base station can include other components, such as downconverters, upconverters, digital-to-analog converters, analog-to-digital converters, etc.

Figure 3:
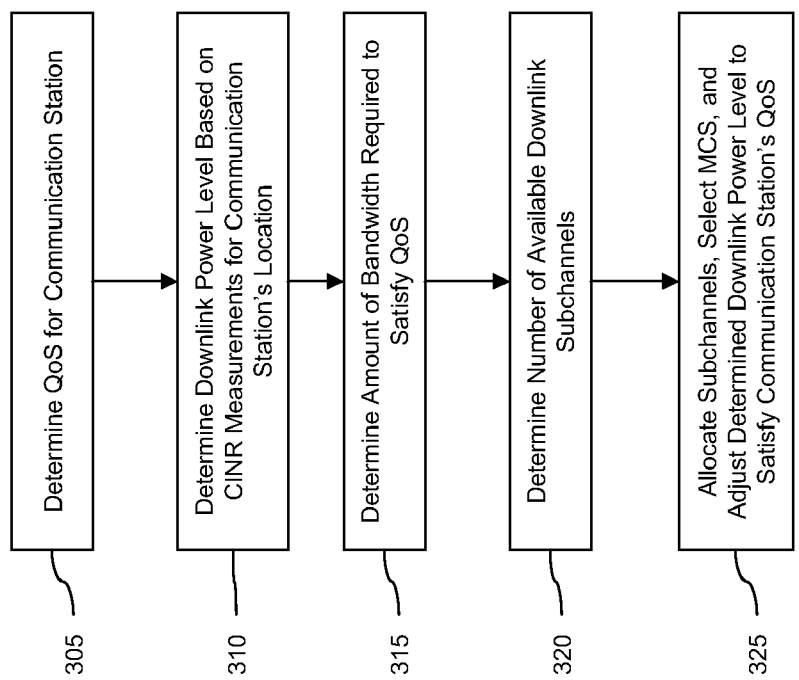
FIG. 3 is a flow diagram of an exemplary method in accordance with the present invention.

FIG. 3 is a flow diagram of an exemplary method in accordance with the present invention. Initially, logic 212 determines a Quality of Service (QoS) for the communication station (step 305). Logic 214 then determines a downlink power level based on carrier-to-interference noise ratio (CINR) for the communication station's location (step 310). It should be recognized that any other type of signal quality measure can be employed. Logic 216 determines an amount of bandwidth required to satisfy the determined QoS (step 315) and logic 218 determines a number of subchannels that are currently available for downlink transmissions (step 320). Logic 222 selects a number of subchannels, logic 224 selects an MCS and logic 226selects an adjusted downlink power level in order to satisfy the determined QoS for the communication device (step 325). The adjusted downlink power level is adjusted relative to a power level determined based the signal quality measurement. The technique described in connection with FIG. 3 can be employed when it is desired to use increased power to satisfy the bandwidth for a group of users, such as users paying for guaranteed bandwidth. In contrast to the method of FIG. 3, conventional systems allocated the total data power equally to all data subchannels.

Figure 4:
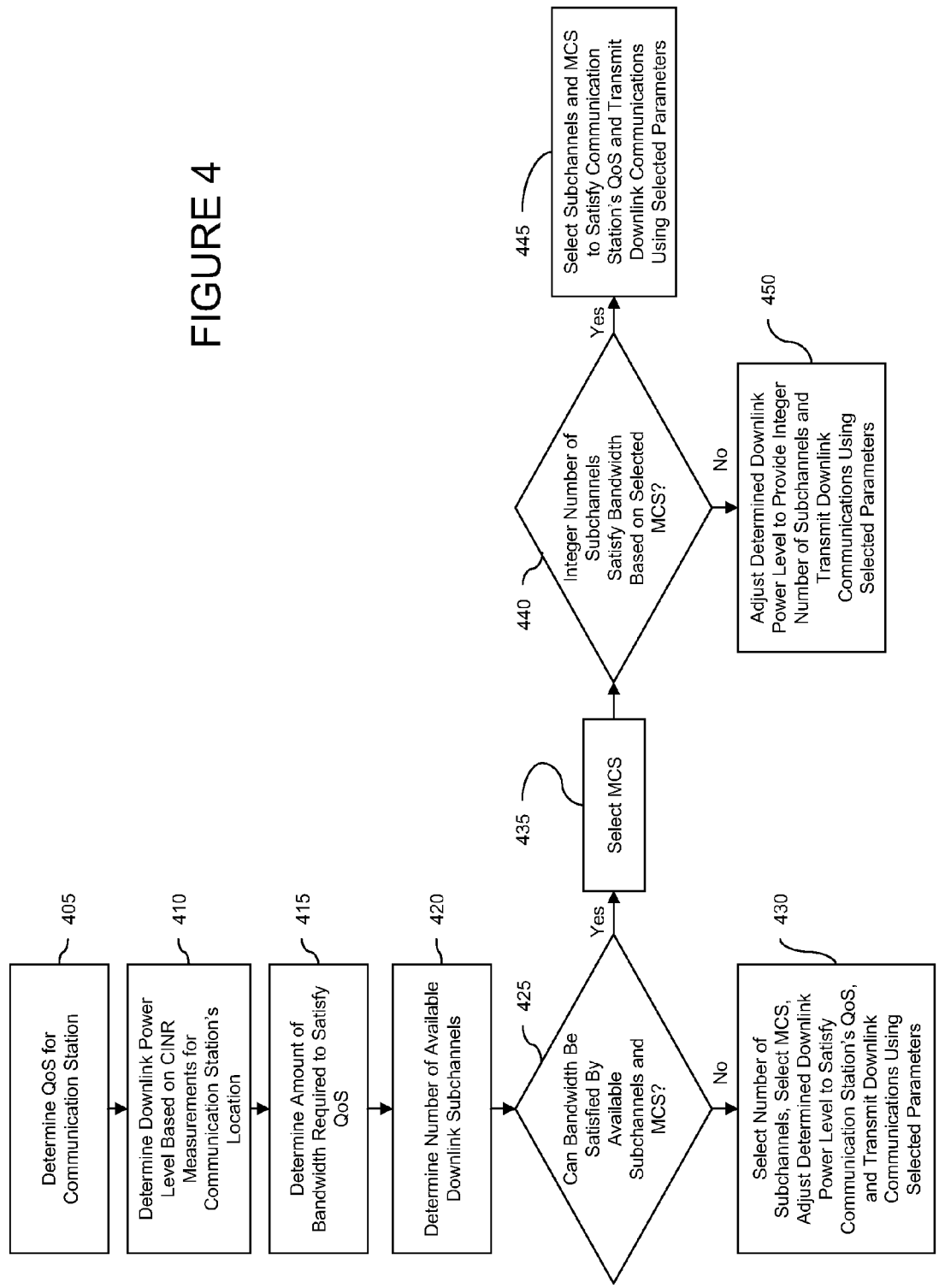
FIG. 4 is a flow diagram of another exemplary method in accordance with the present invention.

FIG. 4 is a flow diagram of another exemplary method in accordance with the present invention. Initially, logic 212 determines a QoS for the communication station (step 405), and logic 214 then determines a downlink power level based on carrier-to-interference noise ratio (CINR) based on the communication station's location (step 410). Logic 216 determines an amount of bandwidth required to satisfy the determined QoS (step 415) and logic 218 determines a number of subchannels that are currently available for downlink transmissions (step 420).

Logic 220 then determines whether the determined amount of bandwidth can be satisfied by the available subchannels and one of the combinations of modulation and coding schemes (step 425). When the amount of determined bandwidth cannot be satisfied by the available subchannels and one of the combinations of modulation and coding schemes ("No" path out of decision step 425), then logic 222 selects a number of subchannels, logic 224 selects an MCS, logic 226 selects an adjusted power level and the base station transmits communications to the communication station using the selected parameters (step 430). Again, the adjusted power level is selected relative to a power level determined based a signal quality measurement.

When the amount of determined bandwidth can be satisfied by the available subchannels and MCS ("Yes" path out of decision step 425), logic 224 selects one of the combinations of modulation and coding schemes (step 435) and logic 220 determines whether an integer number of subchannels can satisfy the determined bandwidth, accounting for the selected MCS (step 440). When an integer number of subchannels can satisfy the bandwidth ("Yes" path out of decision step 440), then logic 222 selects an integer number of subchannels, logic 224 selects one of the combinations of modulation and coding schemes, and the base station transmits communications to the communication station using the determined downlink power level (from step 410), the selected MCS (from step 435) and the selected number of subchannels (step 445). When an integer number of subchannels cannot satisfy the bandwidth, logic 226 adjusts the determined downlink power level such that, based on the selected MCS, the bandwidth can be satisfied by an integer number of subchannels, and the base station transmits communications to the communication station using the selected parameters (step 450).

Using the techniques described above, the amount of bandwidth allocated to a communication station can be satisfied by increasing an amount of power for downlink transmissions to the communication station. This increase in power can be performed when the number of available subchannels and MCS cannot satisfy the allocated bandwidth and/or the determined power level and selected MCS provides a non-integer number of subchannels to satisfy the allocated bandwidth.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of allocating radio resources, comprising:
determining, by a base station processor, whether a bandwidth assigned to a communication station can be satisfied using available subchannels and a modulation and coding scheme (MCS);
when the bandwidth cannot be satisfied using available subchannels and MCS,
  selecting, by the base station processor, a number of the available subchannels,
  selecting, by the base station processor, an MCS, and
  adjusting, by the base station processor, a power level for communications transmitted to the communication station relative to a power level determined based on a signal quality measurement; and
transmitting, by a base station transmitter, information to the communication station using the selected number of subchannels, MCS and adjusted power level;
when the bandwidth can be satisfied using available subchannels and MCS, the method further comprising
  selecting an MCS; and
  determining whether an integer number of subchannels satisfy the assigned bandwidth, wherein when a non-integer number of subchannels are required to satisfy the assigned bandwidth, the method comprising
    selecting an integer number of subchannels; and
    selecting an adjusted power level that satisfies the assigned bandwidth based on the selected MCS and selected number of subchannels.

2. The method of claim 1, further comprising:
determining a quality of service associated with the communication station, wherein the bandwidth assigned to the communication station is based on the determined quality of service.

3. The method of claim 1, further comprising:
determining a downlink power level for the communication station based on the signal quality measurement, wherein the adjusted power level is adjusted from the determined downlink power level.

4. The method of claim 1, wherein the information is transmitted in accordance with WiMAX protocol.

5. A base station, comprising:
a transceiver coupled to an antenna; and
a processor, coupled to the transceiver; and
a non-transitory memory, coupled to the processor, the memory storing computer-readable code, which when executed by the processor causes the processor to determine whether a bandwidth assigned to a communication station can be satisfied using available subchannels and a modulation and coding scheme (MCS), wherein when the bandwidth cannot be satisfied using available subchannels and MCS the computer-readable code, when executed by the processor, causes the processor to
  select a number of the available subchannels,
  select an MCS, and
  adjust a power level for communications transmitted to the communication station relative to a power level determined based on a signal quality measurement, wherein the transceiver transmits information to the communication station using the selected number of subchannels, MCS and adjusted power level, wherein when the bandwidth can be satisfied using available subchannels and MCS, the computer-readable code, when executed by the processor, causes the processor to selecting an MCS; and determining whether an integer number of subchannels satisfy the assigned bandwidth, wherein when a non-integer number of subchannels are required to satisfy the assigned bandwidth, the computer-readable code, when executed by the processor, causes the processor to select an integer number of subchannels; and select an adjusted power level that satisfies the assigned bandwidth based on the selected MCS and selected number of subchannels.

6. The base station of claim 5, wherein the computer-readable code, when executed by the processor, causes the processor to determine a quality of service associated with the communication station, wherein the bandwidth assigned to the communication station is based on the determined quality of service.

7. The base station of claim 5, wherein the computer-readable code, when executed by the processor, causes the processor to determine a downlink power level for the communication station based on the signal quality measurement, wherein the adjusted power level is adjusted from the determined downlink power level.

8. The base station of claim 5, wherein the information is transmitted in accordance with WiMAX protocol.

9. A base station, comprising:

a transceiver coupled to an antenna; and a processor, coupled to the transceiver, comprising bandwidth satisfaction logic that determines whether a bandwidth assigned to a communication station can be satisfied using available subchannels and a modulation and coding scheme (MCS), wherein when the bandwidth cannot be satisfied using available subchannels and MCS, subchannel selection logic selects a number of the available subchannels, MCS selection logic selects an MCS, and power level selection logic adjusts a power level for communications transmitted to the communication station relative to a power level determined based on a signal quality measurement, and the base station transmits information to the communication station using the selected number of subchannels, MCS and adiusted power level, wherein the bandwidth satisfaction logic, subchannel selection logic, MCS selection logic and power level selection are hard-wired logic, wherein when the bandwidth can be satisfied using available subchannels and MCS the MCS logic selects an MCS; and the bandwidth satisfaction logic determines whether an integer number of subchannels satisfy the assigned bandwidth, wherein when a non-integer number of subchannels are required to satisfy the assigned bandwidth, the subchannel selection logic selects an integer number of subchannels; and the power level selection logic selects an adjusted power level that satisfies the assigned bandwidth based on the selected MCS and selected number of subchannels.

10. The base station of claim 9, further comprising:

hard-wired logic that determines a quality of service associated with the communication station, wherein the bandwidth assigned to the communication station is based on the determined quality of service.

11. The base station of claim 9, further comprising:

hard-wired logic that determines a downlink power level for the communication station based on the signal quality measurement, wherein the adjusted power level is adjusted from the determined downlink power level.

12. The base station of claim 9, wherein the information is transmitted in accordance with WiMAX protocol.

* * * * *